(12) United States Patent
Chen et al.

(10) Patent No.: US 11,455,386 B2
(45) Date of Patent: Sep. 27, 2022

(54) AUTHENTICATION BASED ON IMAGE CLASSIFICATION

(71) Applicant: International Business Machines Corporation, Armonk, NY (US)

(72) Inventors: Yu-Siang Chen, Minxiong (TW); Ryan Young, Taipei (TW); Ting-Chieh Yu, Taipei (TW); Ching-Chun Liu, Taipei (TW); Cheng-Fang Lin, New Taipei (TW)

(73) Assignee: International Business Machines Corporation, Armonk, NY (US)

( * ) Notice: Subject to any disclaimer, the term of this patent is extended or adjusted under 35 U.S.C. 154(b) by 578 days.

(21) Appl. No.: 16/594,517

(22) Filed: Oct. 7, 2019

(65) Prior Publication Data
US 2021/0103652 A1 Apr. 8, 2021

(51) Int. Cl.
*G06F 21/44* (2013.01)
*G06N 3/08* (2006.01)
*G06K 9/62* (2022.01)
*G06N 3/04* (2006.01)

(52) U.S. Cl.
CPC ............ *G06F 21/44* (2013.01); *G06K 9/628* (2013.01); *G06K 9/6256* (2013.01); *G06N 3/0454* (2013.01); *G06N 3/08* (2013.01)

(58) Field of Classification Search
CPC ...... G06F 21/44; G06K 9/6256; G06K 9/628; G06K 9/6268; G06N 3/0454; G06N 3/08; G06V 10/82
USPC .......................................................... 726/3
See application file for complete search history.

(56) References Cited

U.S. PATENT DOCUMENTS

| | | | | |
|---|---|---|---|---|
| 8,086,745 | B2* | 12/2011 | Liew ....................... | G06F 21/36 |
| | | | | 713/182 |
| 8,732,477 | B2* | 5/2014 | Osborn ................... | G06F 21/36 |
| | | | | 713/182 |
| 8,769,669 | B2* | 7/2014 | Le ........................... | G06F 21/36 |
| | | | | 726/19 |
| 9,064,104 | B2* | 6/2015 | Riddiford ............ | G06V 10/757 |
| 9,390,249 | B2* | 7/2016 | Leahy ..................... | G06F 21/36 |
| 10,157,275 | B1* | 12/2018 | Venkatasamy .......... | G06F 21/36 |
| 10,909,230 | B2* | 2/2021 | Vilke ..................... | H04L 9/3226 |
| 11,003,756 | B2* | 5/2021 | Gras ........................ | G06F 21/45 |
| 11,177,963 | B2* | 11/2021 | Famechon ............ | H04L 9/3247 |

(Continued)

FOREIGN PATENT DOCUMENTS

CN 101309147 A 11/2008

OTHER PUBLICATIONS

Mell et al., "The NIST Definition of Cloud Computing", Recommendations of the National Institute of Standards and Technology, Special Publication 800-145, Sep. 2011, 7 pages.

(Continued)

*Primary Examiner* — Juan A Torres
(74) *Attorney, Agent, or Firm* — David B. Woycechowsky (57) ABSTRACT

Computer technology for sending an image a device to be authenticated. The image is designed to be classified to a first category by an image classifier, and the first category is different from a nature category of the image. A response message can be received from the device. The response message indicates a second category of the image determined by the device. Then, the device is determined to be an authorized device in response to the second category being consistent with the first category.

20 Claims, 5 Drawing Sheets

(56) References Cited

U.S. PATENT DOCUMENTS

| | | | |
|---|---|---|---|
| 2006/0156385 A1* | 7/2006 | Chiviendacz | H04L 63/20 |
| | | | 726/2 |
| 2010/0043062 A1 | 2/2010 | Alexander | |
| 2016/0050198 A1* | 2/2016 | Thibadeau Sr. | H04L 63/0807 |
| | | | 726/6 |
| 2020/0285715 A1* | 9/2020 | Seguin | G06F 21/31 |

OTHER PUBLICATIONS

Parmar et al., "Generation of Secure One-Time Password Based on Image Authentication", Sundarapandian et al. (Eds): CoNeCo,WiMo, NLP, CRYPSIS, ICAIT, ICDIP, ITCSE, CS & IT 07, pp. 195-206, 2012, DOI: 10.5121/csit.2012.2417, © CS & IT-CSCP 2012, <https://www.airccj.org/CSCP/vol2/csit2417.pdf>.

Sukanya et al., "Image Based Password Authentication System for Banks", International Conference on Information,Communication & Embedded Systems (ICICES 2017), 8 pages, © 2017 IEEE.

Yuan et al., "Adversarial Examples: Attacks and Defenses for Deep Learning", arXiv:1712.07107v3 [cs.LG] Jul. 7, 2018, 20 pages, < https://arxiv.org/pdf/1712.07107.pdf>.

\* cited by examiner

AUTHENTICATION BASED ON IMAGE CLASSIFICATION

BACKGROUND

The present invention relates to authentication technologies, and more specifically, to methods, systems, and computer program products for authentication based on image classification.

In many industries, when a server receives a transaction request from a device, the server needs to verify whether the device is an authorized device for requesting a transaction. If the sever verifies that the device is an authorized device, the server can process the requested transaction.

SUMMARY

According to an aspect of the present invention, there is a method, computer program product and/or system that performs the following operations (not necessarily in the following order): (i) sending an image to a device, where the image is adapted to be classified to a first category by an image classifier, and where the first category is different from an actual category of the image; (ii) receiving a response message from the device, where the response message indicates a second category of the image determined by the device; and (iii) determining the device to be an authorized device in response to the second category being consistent with the first category.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. As used herein, "and/or" shall be construed as an inclusive or; for example, A, B "and/or" C means that at least one of A or B or C is true and applicable.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
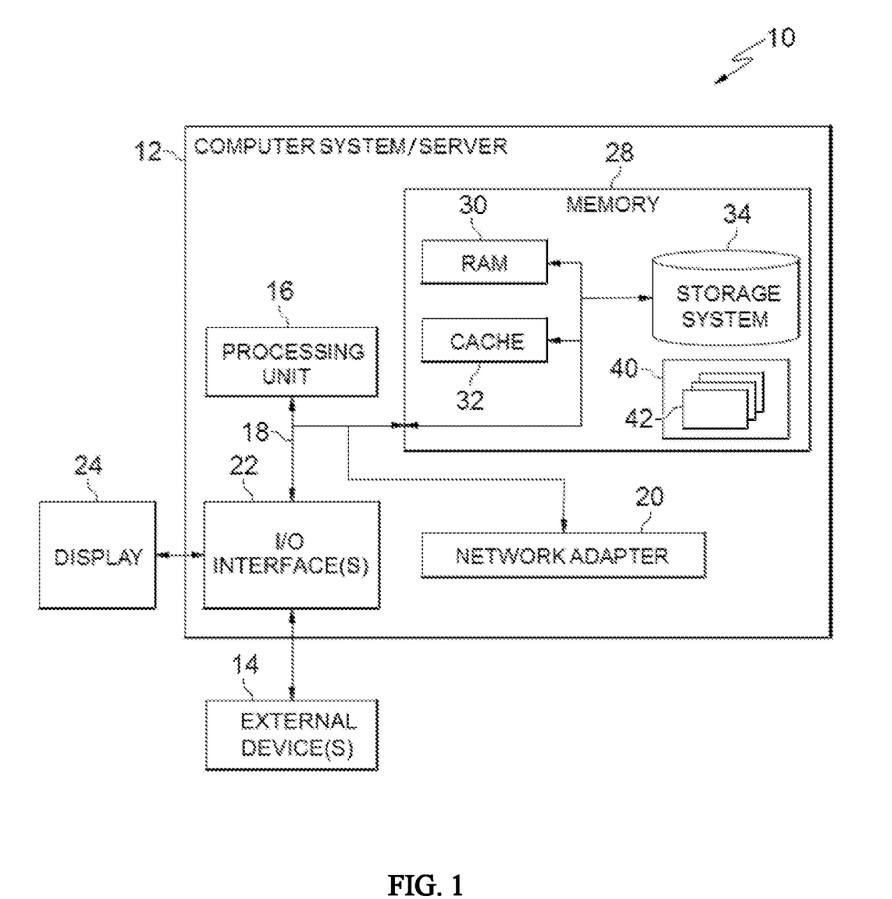
FIG. 1 depicts a cloud computing node, according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
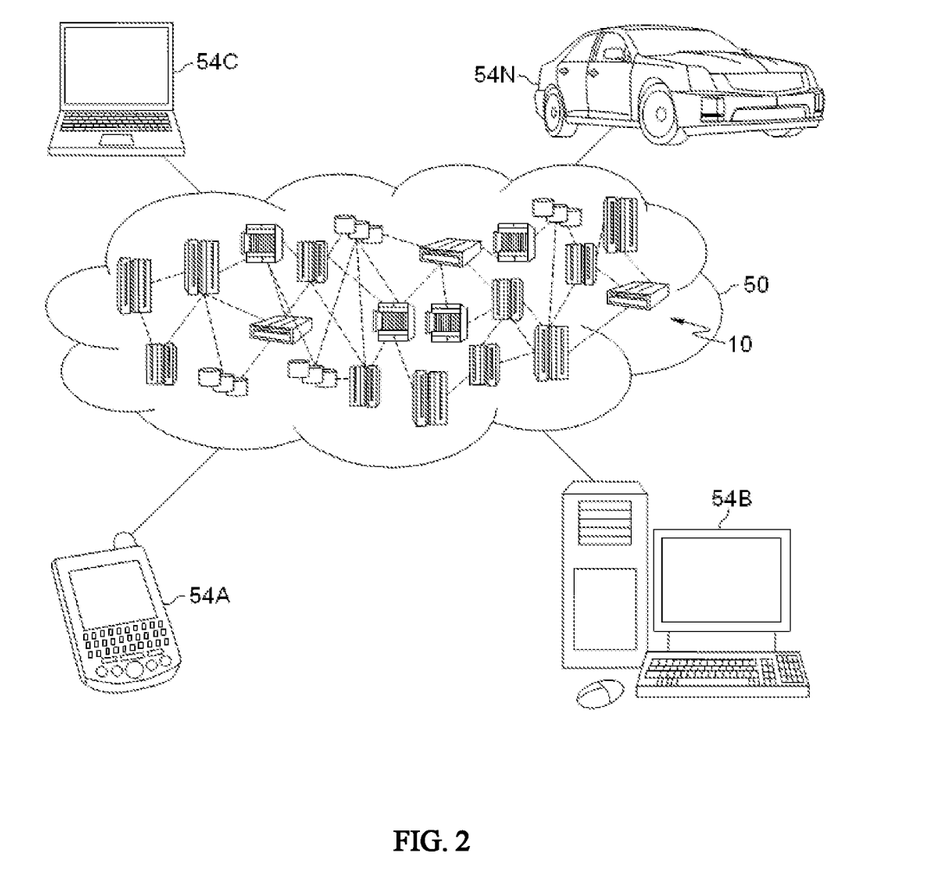
FIG. 2 depicts a cloud computing environment, according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
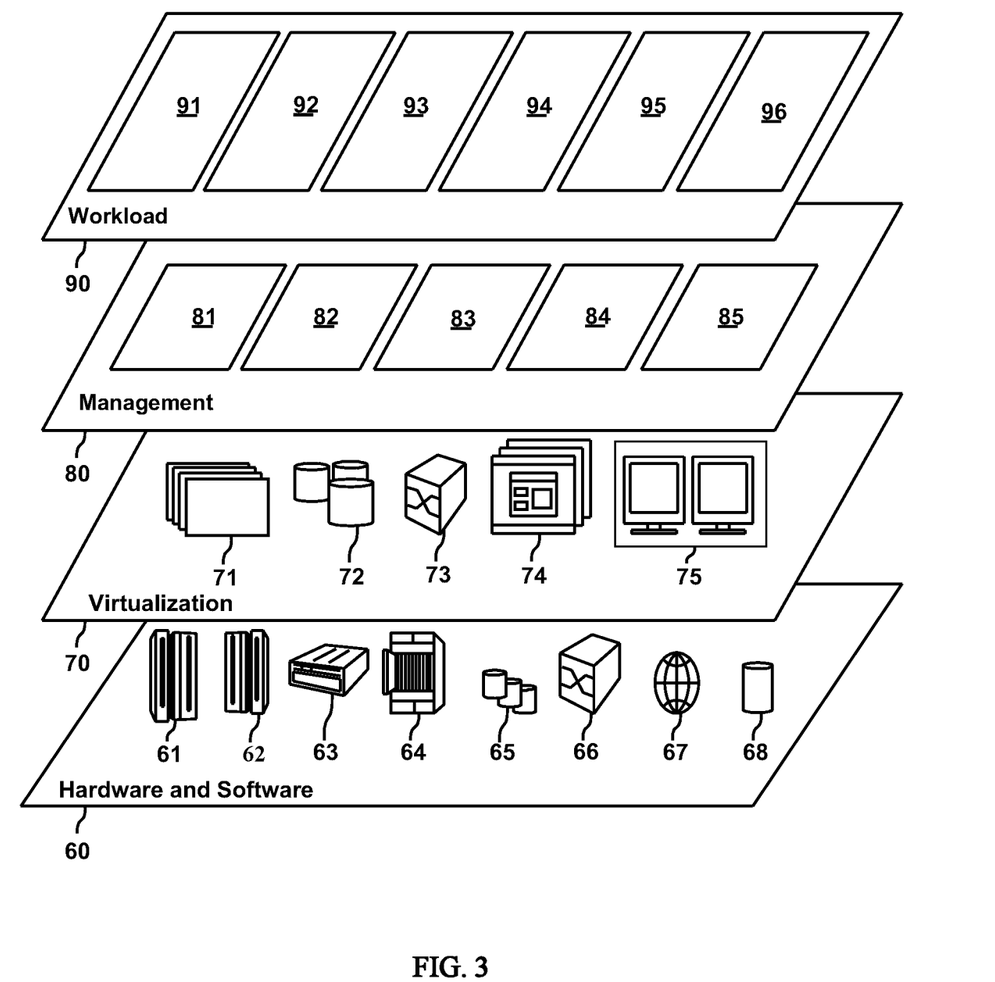
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authentication 96.

Authentication technologies are needed in many circumstances. Embodiments of the present invention provide approaches to implement device authentication securely.

Figure 4:
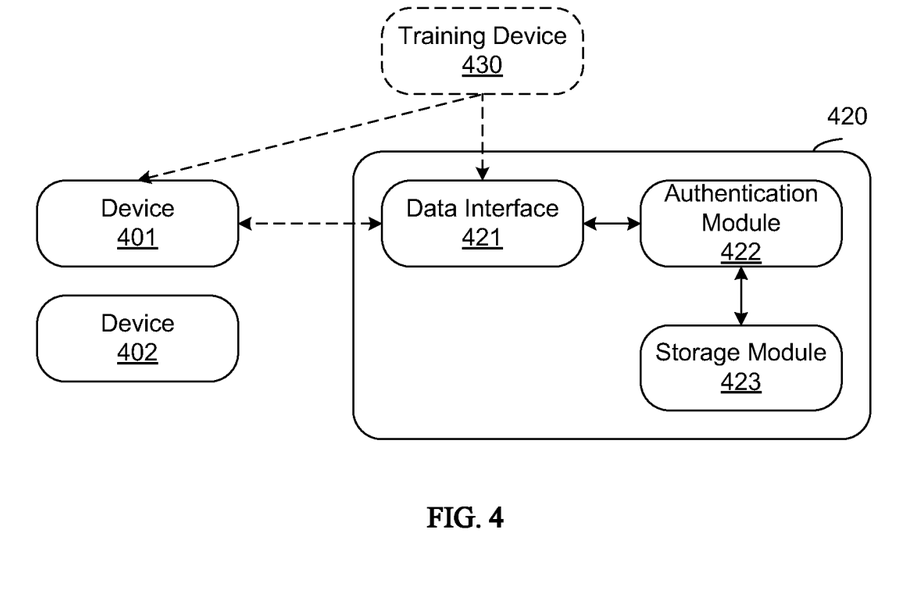
FIG. 4 depicts a schematic diagram of an example authentication environment, according to an embodiment of the present invention.

Referring now to FIG. 4, an example authentication environment is depicted. In FIG. 4, a connection is established between a device 401 and a server 420. As mentioned below, devices 401 and 402 can also run classifiers. Devices 401, 402 may be devices used by a user, such as, a smartphone, a cellular handset, a mobile phone, a personal computer, a desktop computer, a laptop computer, a tablet computer, etc. Devices 401 and 402 may also take the form of a server side which sends transaction requests to a server, such as, the server 420. The connection can be a wired or wireless data link which can be used for communication between the device 401 and the server 420, such as a Local Area Network (LAN) link, a Wide Area Network (WAN) link, an Internet link, a cellular network link, etc. In some examples, the server 420 can be a transaction server that process transaction requests from user devices, such as, a bank server, an online shopping server, etc. In some other examples, the server 420 can be an authentication server that can be used to authenticate a user device and the authentication result can be provided by the server 420 to a transaction server. The server 420 comprises one or more modules, such as, a data interface 421, an authentication module 422, and a storage module 423. It should be understood that the authentication environment in FIG. 4 may comprise one or more devices or servers not shown in FIG. 4. The modules in FIG. 4 are depicted for the purpose of describing embodiments of the present invention. The server 420 may also comprise one or more modules not shown in FIG. 4. One or more modules shown in FIG. 4 may be omitted, combined as a single module, or divided into multiple sub modules.

In some embodiments, if the device 401 tries to log in the server 420, access the server 420, or request one or more other transactions to be processed by the server 420, etc., the server 420 may need to check whether the device 401 is an authorized device.

According to embodiments of the present invention, to check whether the device 401 is an authorized device, the server 420 may send an image (also referred to as "passcode image" hereinafter) to the device 401 through the data interface 421. The image is designed to be classified to a first category by a trained image classifier. In these embodiments, the first category can be a pseudo category different from a nature category of the image, wherein the nature category (also referred to as an "actual category") represents a category of the image complying with common knowledge or common experiences. For example, for an image of a dog, the nature category of the image is "Dog", but the image can be classified by a trained image classifier to a pseudo category, such as "Bird". Without the trained image classifier, a device or even a user of the device is not able to recognize the passcode image to be the pseudo category.

It should be recognized that, generally speaking, the pseudo category is a category that would be difficult for a device or user to determine intuitively (that is, without the help of the trained image classifier). As such, in many cases the pseudo category is defined as being different from the actual category by at least a particular difference threshold.

For example, in some embodiments, the difference between the actual category and a candidate pseudo category is a geometric distance based on respective vector representations of the actual category and the candidate pseudo category, where the vector representations take into account syntactic characteristics, semantic characteristics, or combinations thereof. In these embodiments, the geometric distance must be above a particular numerical threshold in order for the candidate pseudo category to be used as the pseudo category. In other embodiments, other ways of determining distances and thresholds may be used.

In some embodiments, a training device 430 can be used to obtain the trained image classifier. The training device 430 can be a module comprised in the server 420, or a separate device outside of the server 420. The training device 430 may obtain a set of training images. Each of the training images can be marked with a category label, which can represent a pseudo category different from a nature category of the image. The category label can be assigned by a user or an administrator of the training device 430, or by a server or device other than the training device 430. An original image classifier can be constructed based on machine learning technologies now-known or to be developed. As an example, the original image classifier can be a normal or general-purpose image classifier constructed based on machine learning technologies. Then, the original image classifier can be trained by reducing a cross entropy between category labels of the training images and categories recognized using the original image classifier, and an intermediate image classifier can be obtained after the training. The training device 430 may determine the intermediate image classifier to be the image classifier in response to the cross entropy between the category labels and categories recognized using the intermediate image classifier complying with a preset condition.

As a further example, if the cross entropy between the category labels and the categories recognized using the intermediate image classifier does not comply with the preset condition, the intermediate image classifier can be further trained by reducing the cross entropy between the category labels and categories recognized using the intermediate image classifier to obtain a second intermediate image classifier. The training device 430 may determine the second intermediate image classifier to be the image classifier in response to the cross entropy between the category labels and categories recognized using the second intermediate image classifier complying with the preset condition. As a further example, the above-mentioned process can be iteratively implemented until a cross entropy between the category labels and categories recognized using a final intermediate image classifier complies with the preset condition, and the final intermediate image classifier can be determined as the trained image classifier.

In some embodiments, the original image classifier is constructed based on a convolutional neural network (CNN). It shall be noted that the CNN is only illustrative and is not intended to suggest any limitation as to the scope of embodiments of the present invention. Those skilled in the art can apply other machine learning technologies to construct the original image classifier.

Figure 5:
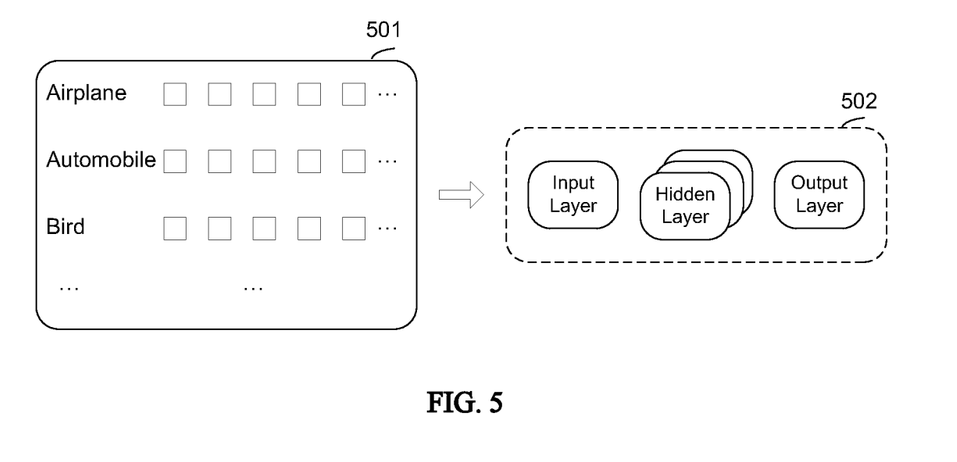
FIG. 5 depicts a schematic diagram of an example classifier training process, according to an embodiment of the present invention.

Referring now to FIG. 5, an example classifier training process is depicted. A training image set 501 is provided as an input to a convolutional neural network (CNN) 502. The training image set 501 comprises images marked with multiple category labels, such as, airplane, automobile, bird, etc. For the purpose of describing embodiments of the present invention, each quadrate in FIG. 5 may represent an image. In some embodiments, category labels assigned to one or more images of the training image set 501 can be different from nature categories of the one or more images. Herein, a nature category of an image may represent a category of the image complying with common knowledges or common experiences. For example, for an image of a dog, the nature category of the image can be "Dog", and the assigned category label can be "Bird", which is different from the nature category.

As an example, the CNN 502 may comprise an input layer, one or more hidden layers and an output layer. The convolutional neural network may be considered as "deep" when it includes two or more hidden layers.

For an image inputted to the CNN 502, an output of the CNN 502 can be a category, which is referred to as a recognized category of the image. In some examples, the CNN 502 can also output one or more categories with confidence values, and the category with the highest confidence value can be referred as the recognized category of the image. The CNN 502 can be trained using the training image set 501 by reducing a cross entropy between the category labels of the training image set 501 and categories recognized using the CNN 502. In some examples, parameters of layers of the CNN 502 can be adjusted during the training. Those skilled in the art may apply multiple manners to adjust the parameters of the CNN 502, such as, random adjusting, adjusting based on expert experiences, etc.

After iterative training for the CNN 502, if the cross entropy between category labels of the training image set 501 and categories recognized using the trained CNN 502 comply with a preset condition, the trained CNN 502 can be used as the trained image classifier for authentication.

In some embodiments, the training device 430 can obtain multiple trained image classifiers which can be different from each other. Each of the trained image classifiers can be assigned to a device. Taking Table 1 as an example, the trained image classifiers comprise Classifier 1 and Classifier 2, etc. The Classifier 1 can be assigned to the device 401, and the Classifier 2 can be assigned to the device 402.

TABLE 1

| Device | Image Classifier |
| --- | --- |
| Device 401 | Classifier 1 |
| Device 402 | Classifier 2 |

In some embodiments, a copy of the trained image classifiers can be sent to one or more devices. For example, a copy of the Classifier 1 can be sent from the training device 430 to the device 401, and then be deployed in the device 401 or a separate device accessible by the device 401. A copy of the Classifier 2 can be sent from the training device 430 to the device 402, and then be deployed in the device 402 or a separate device accessible by the device 402. In this example, if an image is sent to the device 401, the device 401 can recognize a category for the image by accessing the copy of Classifier 1. In some embodiments, for a same image sent to both the device 401 and the device 402, as the Classifier 1 is different from the Classifier 2, the category for the image recognized respectively by the device 401 and the device 402 will be different.

In some embodiments, a user can receive an image classifier (such as, a copy of Classifier 1) from the training device 430 when the user registers the device 401 as an authorized device to the server 420. The device 401 can then deploy the copy of the Classifier 1 for future authentication.

In some embodiments, the copy of the Classifier 1 can be deployed in a separate security device accessible by the device 401. The device 401 can access the copy of the Classifier 1 deployed in the device 401 or the security device for future authentication. If the device 401 is not registered by the user as an authorized device, the device 401 will not be able to access the copy of the Classifier 1. As a specific example, when a user selects to register a mobile phone as an authorized device for requesting transactions to a server of a bank, the user can receive an image classifier from the server of the bank, and then the received image classifier can be deployed in the mobile phone or a separate security device accessible by the mobile phone (such as, a security device with a wireless connection to the mobile phone, etc.) for future authentication. If the device 401 tries to request a transaction to be processed by the server 420, the server 420 will send a passcode image to the device 401.

In some further embodiments, the training device 430 can also generate the image sent to the device 401. The training device 430 can combine one or more perturbation pixels to an original image to obtain an intermediate image. In some embodiments, combining the one or more perturbation pixels to the original image may include: adding the one or more perturbation pixels to the original image, covering or replacing one or more pixels in the original image with by the one or more perturbation pixels, etc. The one or more perturbation pixels can be generated randomly with different positions and values of color spaces (such as, Red, Green and/or Blue values, YCrCb values, etc.). The one or more perturbation pixels can also be generated according to expert experiences or knowledge. The training device 430 can classify the intermediate image using a trained image classifier (such as, Classifier 1, Classifier 2, etc.). If the intermediate image is classified to be the first category, the intermediate image can be used as the passcode image sent to the device. In this example, the first category is different from a nature category of the original image.

As a further example, if the intermediate image is not classified to the first category by the trained image classifier, the training device 430 may combine one or more further perturbation pixels to the intermediate image to obtain a second intermediate image. The training device 430 may classify the second intermediate image using the image classifier. If the second intermediate image is classified to the first category, the training device 430 may determine the second intermediate image to be the passcode image sent to the device. As a further example, the above-mentioned process can be iteratively implemented until a final intermediate image is classified to the first category, and the final intermediate image can be used as the passcode image sent to the device 401.

In some embodiments, the passcode image sent to the device is classified by the trained image classifier to the first category as a confidence value of the first category is higher than confidence values of other categories obtained using the trained image classifier. The trained image classifier can output the first category and the other categories, and corresponding confidence values. In some other embodiments, the trained image classifier can have a softmax function in the output layer (final layer) of the deep CNN, and the passcode image sent to the device is classified by the trained image classifier to the first category. The trained image classifier can output the first category directly.

In some embodiments, for a trained image classifier (such as, Classifier 1, Classifier 2, etc.), one or more passcode images can be obtained and stored in a database of the training device 430 which can be accessed by the server 420. One or more pseudo categories corresponding to the passcode images can also be stored in the database. Taking Table 2 as an example, the training device 430 can generate Passcode Image 11, Passcode image 12, and/or one or more other passcode images. for the device 401. The pseudo category corresponding to Passcode Image 11 is "Airplane", and the pseudo category corresponding to Passcode Image 12 is "Automobile". The server 420 can select at least one passcode image from the training device 430 and then send the selected passcode image to the device 401 for authentication. In this example, the server 420 can select the passcode image randomly or based on one or more preset rules. Those skilled in the art can configure the one or more preset rules.

TABLE 2

| Device | Image Classifier | Passcode Image | Pseudo Category |
|---|---|---|---|
| Device 401 | Classifier 1 | Passcode Image 11<br>Passcode Image 12<br>... | Airplane<br>Automobile<br>... |
| Device 402 | Classifier 2 | Passcode Image 21<br>... | Bird<br>... |

As an example, after the server 420 receives a transaction request from the device 401, the server 420 may obtain an identifier of the device 401, such as, an Internet Protocol (IP) address the device 401, a user account of the device 401, etc. The server 420 can then query passcode images from the training device 430 using the identifier of the device 401. Then the server 420 can select a passcode image (such as, Passcode Image 11) as the passcode image used for current authentication and send the passcode image to the device 401.

In some embodiments, after the device 401 receives the passcode image, the device 401 may recognize (determine) a category of the image (referred to as a second category of the image hereinafter). If a copy of the trained image classifier (such as, Classifier 1) corresponding to the received passcode image has been deployed in the device 401 or a security device accessible by the device 401 prior to the authentication, the second category of the image recognized by the device 401 by accessing the trained image classifier will be consistent with the first category. For example, the device 401 can access the copy of the trained image classifier and classify the passcode image using the copy of the trained image classifier to determine the second category. If a copy of the image classifier (such as, Classifier 1) has not been deployed in the device 401 or a device accessible by the device 401, the device 401 will not be able to access the copy of the image classifier. In this case, the device 401 will not be able to recognize the image, or the device 401 will classify the passcode image to a category not consistent with the first category (i.e., the second category recognized by the device 401 will not be consistent with the first category).

According to embodiments of the present invention, the server 420 may receive a response message from the device 401 through the data interface 421, wherein the response message indicates the second category of the image.

In some embodiments, the response message may comprise a category field, which can be filled with the second category recognized by the device 401. In some embodiments, if the device 401 is not able to recognize the image, the category field in the response message can be set as "NULL".

According to embodiments of the present invention, the authentication module 422 of the server 420 may authenticate the device 401 based on the second category recognized by the device 401 and the first category.

In some embodiments, in parallel with obtaining the passcode image from the training device 430, the server 420 can also obtain the first category from the training device 430. As an example, the server 420 can obtain Passcode Image 11 and the pseudo category "Airplane" from the training device 430. In this example, the obtained first category is "Airplane" corresponding to Passcode Image 11.

In some other embodiments, the response message received by the server 420 may also comprise an identifier of the device 401. The authentication module 422 can obtain the identifier of the device 401 from the response message. The authentication module 422 can acquire the trained image classifier corresponding to the device 401 (such as, Classifier 1) through querying stored image classifiers in the training device 430 using the identifier of the device 401. Then, the authentication module 422 can run the trained image classifier to obtain the first category of the image.

In some other embodiments, the authentication module 422 may query previously stored categories of images in training device 430 using the identifier of the device to obtain the first category.

In some embodiments, the response message received from the device 401 can be processed by the authentication module 422. Then the authentication module 422 can obtain the second category of the image recognized by the device 401 indicated by the category field of the response message. If the second category recognized by the device is consistent with the first category, the authentication module 422 will determine the device 401 to be an authorized device. If the second category recognized by the device is not consistent with the first category, the authentication module 422 will determine the device 401 to be an unauthorized device. As a further example, if the response message indicates the device 401 is not able to determine a category of the image (such as, the category field in the received response message is "NULL"), the authentication module 422 will determine the device 401 to be an unauthorized device.

If the device 401 is determined to be an authorized device, the server 420 can allow the device 401 to log in the server 420, access the server 420, or the server 420 can implement a transaction requested by the device 401, etc.

According to embodiments of the present invention, as only a trained image classifier can classify the passcode image into a pseudo category, if the device to be authenticated can access a copy of the trained image classifier, the device can classify the passcode image correctly to the pseudo category. In these embodiments, the trained image classifier is difficult or even impossible to be imitated. As a result, the device can be authenticated based on the classification result.

Figure 6:
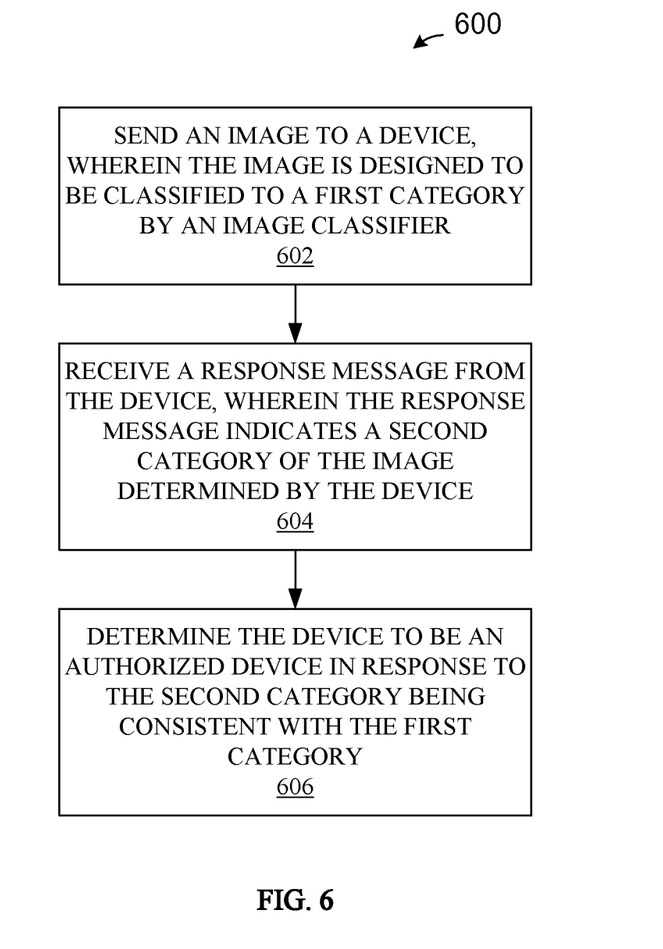
FIG. 6 depicts a flow chart of an example method for authentication, according to an embodiment of the present invention.

With reference to FIG. 6, a method 600 for authentication is illustrated according to embodiments of the invention. The method 600 can be implemented by the computer system/server 12 of FIG. 1 or a computer node 10 in a cloud system. The method 600 can also be implemented by the server 420 of FIG. 4. It should be noted that the method 600 is only illustrative and is not intended to suggest any limitation as to the scope of embodiments of the present invention.

At step 602, an image is sent to a device to be authenticated. The image is designed to be classified to a first category by an image classifier. The first category is different from a nature category of the image. At step 604, a response message is received from the device. The response message indicates a second category of the image recognized by the device. Then at step 606, the device is determined to be an authorized device in response to the second category being consistent with the first category.

As an example, if the device can access a copy of the image classifier previously deployed in the device or a separate security device with a communication link with the device (i.e., the copy of the image classifier is accessible by the device), the device can use the copy of the image classifier to classify the image, and the second category of the image recognized by the device will be consistent with the first category. If the device is not able to access a copy of the image classifier, the device will not be able to recognize a category of the image, or the device will classify the passcode image to a category not consistent with the first category (i.e., the second category recognized by the device will not be consistent with the first category).

As a further example, if the second category recognized by the device is not consistent with the first category or the response message indicates the device is not able to recognize a category of the image, the device is determined to be an unauthorized device.

It should be noted that the processing of authentication according to embodiments of the present invention could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    sending, by one or more processors, an image to a device, wherein the image is adapted to be classified to a first category by an image classifier, and wherein the first category is different from an actual category of the image;
    receiving, by one or more processors, a response message from the device, wherein the response message indicates a second category of the image determined by the device; and
    determining, by one or more processors, the device to be an authorized device in response to the second category being consistent with the first category.

2. The computer-implemented method of claim 1, further comprising generating, by one or more processors, the image classifier, wherein generating the image classifier includes:
    obtaining, by one or more processors, a set of training images with corresponding category labels;
    constructing, by one or more processors, an original image classifier;
    training, by one or more processors, the original image classifier by reducing a cross entropy between the category labels and categories recognized using the original image classifier, to generate an intermediate image classifier; and
    determining, by one or more processors, the intermediate image classifier to be the image classifier in response to the cross entropy between the category labels and categories recognized using the intermediate image classifier complying with a preset condition.

3. The computer-implemented method of claim 2, wherein the original image classifier is constructed based on a convolutional neural network (CNN).

4. The computer-implemented method of claim 1, further comprising generating, by one or more processors, the image, wherein generating the image includes:
  combining, by one or more processors, one or more perturbation pixels to an original image to generate an intermediate image, wherein the original image is classified to an actual category of the original image;
  classifying, by one or more processors, the intermediate image using the image classifier; and
  determining, by one or more processors, whether the intermediate image is the image based, at least in part, on whether the intermediate image is classified to the first category.

5. The computer-implemented method of claim 4, wherein generating the image further includes:
  combining, by one or more processors, one or more further perturbation pixels to the intermediate image to generate a second intermediate image in response to the intermediate image not being classified to the first category;
  classifying, by one or more processors, the second intermediate image using the image classifier; and
  determining, by one or more processors, the second intermediate image to be the image in response to the second intermediate image being classified to the first category.

6. The computer-implemented method of claim 1, wherein the image is classified to the first category by the image classifier in response to a confidence value of the first category being higher than confidence values of one or more other categories.

7. The computer-implemented method of claim 1, wherein the second category is determined by the device using a copy of the image classifier which is accessible by the device.

8. A computer program product comprising a computer readable storage medium having stored thereon:
  program instructions to send an image to a device, wherein the image is adapted to be classified to a first category by an image classifier, and wherein the first category is different from an actual category of the image;
  program instructions to receive a response message from the device, wherein the response message indicates a second category of the image determined by the device; and
  program instructions to determine the device to be an authorized device in response to the second category being consistent with the first category.

9. The computer program product of claim 8, the computer readable storage medium having further stored thereon program instructions to generate the image classifier, wherein the program instructions to generate the image classifier include:
  program instructions to obtain a set of training images with corresponding category labels;
  program instructions to construct an original image classifier;
  program instructions to train the original image classifier by reducing a cross entropy between the category labels and categories recognized using the original image classifier, to generate an intermediate image classifier; and
  program instructions to determine the intermediate image classifier to be the image classifier in response to the cross entropy between the category labels and categories recognized using the intermediate image classifier complying with a preset condition.

10. The computer program product of claim 9, wherein the original image classifier is constructed based on a convolutional neural network (CNN).

11. The computer program product of claim 8, the computer readable storage medium having further stored thereon program instructions to generate the image, wherein the program instructions to generate the image include:
  program instructions to combine one or more perturbation pixels to an original image to generate an intermediate image, wherein the original image is classified to an actual category of the original image;
  program instructions to classify the intermediate image using the image classifier; and
  program instructions to determine whether the intermediate image is the image based, at least in part, on whether the intermediate image is classified to the first category.

12. The computer program product of claim 11, wherein the program instructions to generate the image further include:
  program instructions to combine one or more further perturbation pixels to the intermediate image to generate a second intermediate image in response to the intermediate image not being classified to the first category;
  program instructions to classify the second intermediate image using the image classifier; and
  program instructions to determine the second intermediate image to be the image in response to the second intermediate image being classified to the first category.

13. The computer program product of claim 8, wherein the image is classified to the first category by the image classifier in response to a confidence value of the first category being higher than confidence values of one or more other categories.

14. The computer program product of claim 8, wherein the second category is determined by the device using a copy of the image classifier which is accessible by the device.

15. A computer system comprising:
  a processor(s) set; and
  a computer readable storage medium;
  wherein:
  the processor set is structured, located, connected and/or programmed to run program instructions stored on the computer readable storage medium; and
  the stored program instructions include:
    program instructions to send an image to a device, wherein the image is adapted to be classified to a first category by an image classifier, and wherein the first category is different from an actual category of the image;
    program instructions to receive a response message from the device, wherein the response message indicates a second category of the image determined by the device; and
    program instructions to determine the device to be an authorized device in response to the second category being consistent with the first category.

16. The computer system of claim 15, the stored program instructions further including program instructions to generate the image classifier, wherein the program instructions to generate the image classifier include:
  program instructions to obtain a set of training images with corresponding category labels;

program instructions to construct an original image classifier;

program instructions to train the original image classifier by reducing a cross entropy between the category labels and categories recognized using the original image classifier, to generate an intermediate image classifier; and program instructions to determine the intermediate image classifier to be the image classifier in response to the cross entropy between the category labels and categories recognized using the intermediate image classifier complying with a preset condition.

17. The computer system of claim 15, the stored program instructions further including program instructions to generate the image, wherein the program instructions to generate the image include:

program instructions to combine one or more perturbation pixels to an original image to generate an intermediate image, wherein the original image is classified to an actual category of the original image;

program instructions to classify the intermediate image using the image classifier; and program instructions to determine whether the intermediate image is the image based, at least in part, on whether the intermediate image is classified to the first category.

18. The computer system of claim 17, wherein the program instructions to generate the image further include:

program instructions to combine one or more further perturbation pixels to the intermediate image to generate a second intermediate image in response to the intermediate image not being classified to the first category;

program instructions to classify the second intermediate image using the image classifier; and program instructions to determine the second intermediate image to be the image in response to the second intermediate image being classified to the first category.

19. The computer system of claim 15, wherein the image is classified to the first category by the image classifier in response to a confidence value of the first category being higher than confidence values of one or more other categories.

20. The computer system of claim 15, wherein the second category is determined by the device using a copy of the image classifier which is accessible by the device.

* * * * *